(12) United States Patent
Yang et al.

(10) Patent No.: US 12,074,677 B2
(45) Date of Patent: Aug. 27, 2024

(54) METHOD AND APPARATUS FOR INDICATING SPATIAL RELATION INFORMATION, AND COMMUNICATIONS DEVICE

(71) Applicant: VIVO MOBILE COMMUNICATION CO., LTD., Guangdong (CN)

(72) Inventors: Yu Yang, Chang'an Dongguan (CN); Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 399 days.

(21) Appl. No.: 17/508,648

(22) Filed: Oct. 22, 2021

(65) Prior Publication Data

US 2022/0045735 A1 Feb. 10, 2022

Related U.S. Application Data

(63) Continuation of application No. PCT/CN2020/085837, filed on Apr. 21, 2020.

(30) Foreign Application Priority Data

Apr. 25, 2019 (CN) .......................... 201910339343.3

(51) Int. Cl.
   *H04B 7/06* (2006.01)
   *H04W 72/044* (2023.01)
   *H04W 72/21* (2023.01)

(52) U.S. Cl.
   CPC ........ *H04B 7/0695* (2013.01); *H04W 72/044* (2013.01); *H04W 72/21* (2023.01)

(58) Field of Classification Search
   CPC .... H04B 7/0695; H04B 7/0408; H04B 7/086; H04B 7/0619; H04W 72/21;
   (Continued)

(56) References Cited

U.S. PATENT DOCUMENTS

2018/0020444 A1* 1/2018 Lee ......................... H04W 72/21
2020/0053721 A1* 2/2020 Cheng .................... H04W 72/21
(Continued)

FOREIGN PATENT DOCUMENTS

CN        102215093 A    10/2011
CN        109391985 A    2/2019
(Continued)

OTHER PUBLICATIONS

U.S. Appl. No. 62/715,397, filed 2018.*
(Continued)

*Primary Examiner* — Rushil P. Sampat
(74) *Attorney, Agent, or Firm* — Brooks Kushman P.C.

(57) ABSTRACT

This disclosure pertains to the field of wireless communications technologies, and a method and an apparatus for indicating spatial relation information, and a communications device are provided. The method for indicating spatial relation information is applied to a network-side device and includes: sending a media access control, control element MAC CE command to user equipment, where the MAC CE command indicates spatial relation information of at least one PUCCH group, each PUCCH group includes at least one PUCCH, and each PUCCH group corresponds to one piece of spatial relation information.

16 Claims, 4 Drawing Sheets

(58) Field of Classification Search
CPC ........... H04W 72/044; H04W 72/0413; H04W 72/23; H04W 72/046
See application file for complete search history.

(56) References Cited

U.S. PATENT DOCUMENTS

| | | | |
|---|---|---|---|
| 2020/0119778 A1* | 4/2020 | Grant | H04B 7/0617 |
| 2020/0245295 A1 | 7/2020 | Kimba Dit Adamou et al. | |
| 2020/0314860 A1* | 10/2020 | Zhou | H04W 72/23 |
| 2021/0136768 A1 | 5/2021 | Kang et al. | |

FOREIGN PATENT DOCUMENTS

| | | |
|---|---|---|
| EP | 3776900 A1 | 2/2021 |
| WO | 2018128365 A1 | 7/2018 |
| WO | 2019190377 A1 | 10/2019 |
| WO | 2020029984 A1 | 2/2020 |

OTHER PUBLICATIONS

U.S. Appl. No. 62/825,301, filed 2019.*
European Search Report issued in corresponding application No. 20794785.4, dated Jun. 7, 2022.
Ericsson, Feature Lead Summary 3 for Beam Measurement and Reporting, R1-1807782, 3GPP TSG-RAN WG1 Meeting #93, Busan, May 21-25, 2018.
Huawei, Hisilicon, UL/DL BM for Latency/Overhead Reduction, R1-1903974, 3GPP TSG RAN WG1 Meeting #96bis, Xi'an, China, Apr. 8-12, 2019.
LG Electronics, Feature Lead Summary of Enhancements on Multi-Beam Operations, R1-1905712, 3GPP TSG RAN WG1 Meeting #96bis, Xi'an, China, Apr. 8-12, 2019.
LG Electronics, Updated Feature Lead Summary of Enhancements of Multi-Beam Operations, R1-1905838, 3GPP TSG RAN WG1 Meeting #96bis, Xi'an, China, Apr. 8-12, 2019.
Nokia, Nokia Shanghai Bell, Enhancements on Multi-Beam Operation, R1-1905065, 3GPP TSG RAN WG1 #96bis Meeting, Xi'an, China, Apr. 8-12, 2019.
ZTE, Enhancements on multi-beam operation, R1-1904014, 3GPP TSG RAN WG1 Meeting #96bis, Xi'an, China, Apr. 8-12, 2019.
Korean Office Action issued in corresponding application No. 10-2021-7038633, dated Aug. 29, 2023.
Chinese Office Action dated Dec. 15, 2021 as received in application No. 201910339343.3.
"Details of latency and overhead reduction for beam management" 3GPP TSG RAN WG1 #96bis, R1-1904022, Apr. 8, 2019. ZTE.
"Feature lead summary of Enhancements of Multi-beam Operations" 3GPP TSG RAN WG1 Meeting #96bis, R1-1905627, Apr. 8, 2019, LG Electronics.
International Search Report and Written Opinion dated Nov. 4, 2021 as received in application No. PCT/CN2020/085837.
"UL beam management" 3GPP TSG RAN WG1 NR Ad-Hoc#2 R1-1710653 Qingdao, China, Jun. 27-30, 2017, Samsung.
"Basic beam recovery" 3GPP TSG-RAN WG1 NR Ad Hoc #3 R1-1716351 Nagoya, Japan, Sep. 18-21, 2017, Ericsson.
"Feature lead summary 1 of beam measurement and reporting" 3GPP TSG RAN WG1 Meeting AH 1801 R1-1801006 Vancouver, Canada, Jan. 22-26, 2018, Ericsson.
"Enhancements on multi-beam operation" 3GPP TSG RAN WG1 #96bis R1-1904736 Xi'an, China, Apr. 8-12, 2019, CMCC.

* cited by examiner

METHOD AND APPARATUS FOR INDICATING SPATIAL RELATION INFORMATION, AND COMMUNICATIONS DEVICE

CROSS-REFERENCE TO RELATED APPLICATIONS

This application is continuation application of PCT International Application No. PCT/CN2020/085837 filed on Apr. 21, 2020, which claims priority to Chinese Patent Application No. 201910339343.3, filed in China on Apr. 25, 2019, the disclosures of which are incorporated herein by reference in their entireties.

TECHNICAL FIELD

This disclosure relates to the field of wireless communications technologies, and in particular, to a method and an apparatus for indicating spatial relation information, and a communications device.

BACKGROUND

In a beam indication mechanism of a physical uplink control channel (PUCCH), a network uses radio resource control (RRC) signaling to configure spatial relation information for each PUCCH resource. When the spatial relation information configured for a PUCCH resource includes a plurality of entries (entry), a media access control (MAC) control element (CE) is used to indicate spatial relation information of one of the entries. When the spatial relation information configured for a PUCCH resource includes only one entry, no additional MAC CE command is required.

The related art has the following problems: One MAC CE command is allowed to update or indicate a spatial relation of only one PUCCH resource, but not allowed to update and/or indicate a spatial relation of one PUCCH group. As a result, a lot of signaling overheads are required for updating or indicating spatial relations of all PUCCHs.

SUMMARY

A method and an apparatus for indicating spatial relation information, and a communications device are provided.

According to a first aspect, an embodiment of this disclosure provides a method for indicating spatial relation information, where the method is applied to a network-side device and includes:
  sending a media access control control element (MAC CE) command to user equipment, where the MAC CE command indicates spatial relation information of at least one PUCCH group, each PUCCH group includes at least one PUCCH, and each PUCCH group corresponds to one piece of spatial relation information.

According to a second aspect, an embodiment of this disclosure provides a method for indicating spatial relation information, where the method is applied to user equipment and includes:
  receiving a media access control control element (MAC CE) command from a network-side device, where the MAC CE command indicates spatial relation information of at least one PUCCH group, each PUCCH group includes at least one PUCCH, and each PUCCH group corresponds to one piece of spatial relation information; and
  determining the spatial relation information of the at least one PUCCH group based on the MAC CE command.

According to a third aspect, an embodiment of this disclosure provides an apparatus for indicating spatial relation information, where the apparatus is applied to a network-side device and includes:
  a sending module, configured to send a media access control control element (MAC CE) command to user equipment, where the MAC CE command indicates spatial relation information of at least one PUCCH group, each PUCCH group includes at least one PUCCH, and each PUCCH group corresponds to one piece of spatial relation information.

According to a fourth aspect, an embodiment of this disclosure provides an apparatus for indicating spatial relation information, where the apparatus is applied to user equipment and includes:
  a receiving module, configured to receive a media access control control element (MAC CE) command from a network-side device, where the MAC CE command indicates spatial relation information of at least one PUCCH group, each PUCCH group includes at least one PUCCH, and each PUCCH group corresponds to one piece of spatial relation information; and
  a determining module, configured to determine the spatial relation information of the at least one PUCCH group based on the MAC CE command.

According to a fifth aspect, an embodiment of this disclosure provides a communications device, including a memory, a processor, and a computer program stored in the memory and capable of running on the processor, where when the computer program is executed by the processor, steps of the foregoing method for indicating spatial relation information are implemented.

According to a sixth aspect, an embodiment of this disclosure provides a computer-readable storage medium, where the computer-readable storage medium stores a computer program, and when the computer program is executed by a processor, steps of the foregoing method for indicating spatial relation information are implemented.

DESCRIPTION OF EMBODIMENTS

To make the technical problem to be resolved by the embodiments of this disclosure, and the technical solutions and advantages of the embodiments of this disclosure clearer, detailed descriptions are hereinafter provided with reference to the drawings and specific embodiments.

In a beam indication mechanism of a physical uplink control channel (PUCCH), a network uses radio resource control (RRC) signaling to configure spatial relation information for each PUCCH resource. When the spatial relation information configured for the PUCCH resource includes a plurality of entries, a media access control (MAC) control element (CE) is used to indicate spatial relation information of one of the entries. When the spatial relation information configured for the PUCCH resource includes only one entry, no additional MAC CE command is required.

Figure 1:
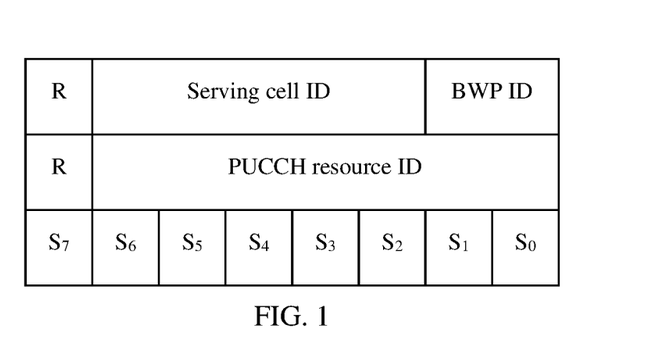
FIG. 1 is a schematic diagram of composition of a MAC CE command.

In a protocol in the related art, a media access control (MAC) protocol data unit (PDU) subheader with a logical channel identifier (Logical Channel ID, LCID) is used to identify a PUCCH spatial relation activation or deactivation MAC CE command (24 bits in total). As shown in FIG. 1, fields in the command are as follows:
- serving cell identity (ID): indicates an identity of a serving cell to which the MAC CE is applied, with a length of 5 bits;
- bandwidth part (BWP) ID: indicates an uplink (UL) BWP to which the MAC CE is applied, with a length of 2 bits;
- PUCCH resource ID: indicates a PUCCH resource ID in an RRC parameter PUCCH-ResourceId, with a length of 7 bits;
- Si: if there is PUCCH Spatial Relation Info of a PUCCH-SpatialRelationInfoId (spatial relation information identity) i, Si is used to indicate an activation status of the PUCCH Spatial Relation Info of the PUCCH-SpatialRelationInfoId i; otherwise, a MAC entity ignores this field; if the Si field is set to 1, it indicates that the PUCCH Spatial Relation Info of the PUCCH-SpatialRelationInfoId i is activated; or if the Si field is set to 0, it indicates that the PUCCH Spatial Relation Info of the PUCCH-SpatialRelationInfoId i is deactivated; and for one PUCCH Resource, only one piece of PUCCH Spatial Relation Info can be activated at a time; and
- R: is a reserved bit, and is set to 0.

In addition, in the foregoing description, a beam may also be referred to as a spatial filter, a spatial domain transmission filter, or the like.

A maximum of 64 PUCCH spatial relations on each BWP can be configured by using RRC signaling.

The related art has the following problems:

One MAC CE command is allowed to update or indicate a spatial relation of only one PUCCH resource, and not allowed to update and/or indicate a spatial relation of a PUCCH group. As a result, a lot of signaling overheads are required for updating or indicating a spatial relation of each PUCCH.

To resolve the foregoing technical problems, the embodiments of this disclosure provide a method and an apparatus for indicating spatial relation information, and a communications device, which can flexibly indicate a spatial relation of each PUCCH group, and reduce signaling overheads of a network-side device for indicating the spatial relation information.

Figure 2:
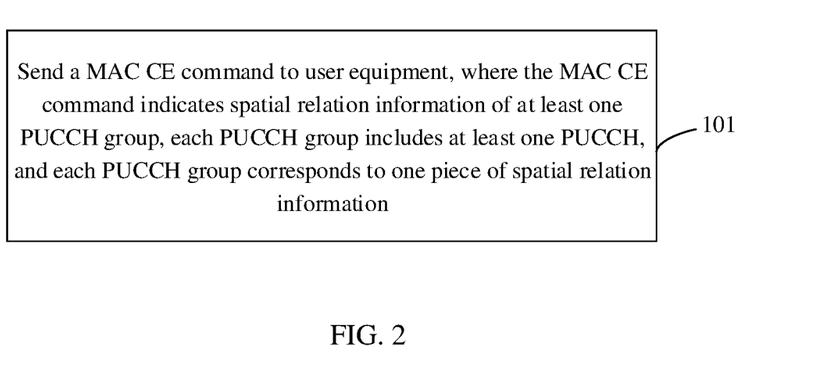
FIG. 2 is a schematic flowchart of a method for indicating spatial relation information according to an embodiment of this disclosure, where the method is applied to a network-side device.

An embodiment of this disclosure provides a method for indicating spatial relation information. The method is applied to a network-side device. As shown in FIG. 2, the method includes the following step.

Step 101: Send a MAC CE command to user equipment, where the MAC CE command indicates spatial relation information of at least one PUCCH group, each PUCCH group includes at least one PUCCH, and each PUCCH group corresponds to one piece of spatial relation information.

In this embodiment, the MAC CE command can be used to update and/or indicate spatial relation information of one PUCCH group, and the PUCCH group includes at least one PUCCH. This can improve flexibility of indicating spatial relation information of PUCCHs, and is compatible with a method for indicating spatial relation information of a PUCCH in the related art. In comparison with the related art that allows one MAC CE to update and/or indicate spatial relation information of only one PUCCH, signaling overheads for indicating the spatial relation information of the PUCCHs can be reduced.

Optionally, the MAC CE command includes at least one of the following: a serving cell identity field, a bandwidth part identity field, a PUCCH resource identity field, a spatial relation information field, or two reserved bits.

In a specific embodiment, the MAC CE command includes first indication information, the first indication information indicates that the MAC CE command is to update or indicate spatial relation information of at least one PUCCH group or to update or indicate spatial relation information of one PUCCH, and each PUCCH group includes a plurality of PUCCHs.

Optionally, the first indication information occupies a first reserved bit and/or a second reserved bit.

In a specific example, when the first indication information indicates that the MAC CE command is to update or indicate spatial relation information of one PUCCH, the spatial relation information field is used to indicate the spatial relation information of the PUCCH.

In a specific example, when the first indication information indicates that the MAC CE command is to update or indicate spatial relation information of all PUCCHs belonging to a same BWP, at least some of bits in the PUCCH resource identity field and/or the spatial relation information field are used to indicate the spatial relation information of all the PUCCHs of the BWP.

In a specific example, all PUCCHs in one BWP are grouped into a plurality of PUCCH groups; and
when the first indication information indicates that the MAC CE command is to update or indicate spatial relation information of at least one PUCCH group in a BWP indicated by the bandwidth part identity field, at least some of bits in the PUCCH resource identity field and/or the spatial relation information field are used to indicate the spatial relation information of the at least one PUCCH group or indicate a group identity and the spatial relation information of the at least one PUCCH group.

In a specific example, the first indication information occupies the first reserved bit; and
when the first indication information indicates that the MAC CE command is to update or indicate spatial relation information of all PUCCHs belonging to a same cell, at least some of bits in the bandwidth part identity field, the second reserved bit, the PUCCH resource identity field, and/or the spatial relation information field are used to indicate the spatial relation information of all the PUCCHs of the cell.

In a specific example, all PUCCHs in one cell are grouped into a plurality of PUCCH groups, and the first indication information occupies the first reserved bit; and when the first indication information indicates that the MAC CE command is to update or indicate spatial relation information of at least one PUCCH group in a cell indicated by the serving cell identity field, at least some of bits in the bandwidth part identity field, the second reserved bit, the PUCCH resource identity field, and/or the spatial relation information field are used to indicate the spatial relation information of the at least one PUCCH group or indicate a group identity and the spatial relation information of the at least one PUCCH group.

In a specific example, the MAC CE command includes second indication information, the second indication information indicates that the MAC CE command is to update or indicate spatial relation information of all PUCCHs belonging to a same BWP, or to update or indicate spatial relation information of all PUCCHs belonging to a same cell, or to update or indicate spatial relation information of one PUCCH.

Optionally, the second indication information occupies a first reserved bit and a second reserved bit.

In a specific example, when the second indication information indicates that the MAC CE command is to update or indicate spatial relation information of one PUCCH, the spatial relation information field is used to indicate the spatial relation information of the PUCCH;

when the second indication information indicates that the MAC CE command is to update or indicate spatial relation information of all PUCCHs belonging to a same BWP, at least some of bits in the PUCCH resource identity field and/or the spatial relation information field are used to indicate the spatial relation information of all the PUCCHs of the BWP; or when the second indication information indicates that the MAC CE command is to update or indicate spatial relation information of all PUCCHs belonging to a same cell, at least some of bits in the bandwidth part identity field, the PUCCH resource identity field, and/or the spatial relation information field are used to indicate the spatial relation information of all the PUCCHs of the cell.

In a specific example, the MAC CE command includes third indication information, the third indication information indicates that the MAC CE command is to update or indicate spatial relation information of one PUCCH or to update or indicate spatial relation information of at least one PUCCH group, each PUCCH group includes a plurality of PUCCHs belonging to different cells or different BWPs, and the third indication information occupies a first reserved bit.

In a specific example, when the third indication information indicates that the MAC CE command is to update or indicate spatial relation information of at least one PUCCH group, at least some of bits in a second reserved bit, the serving cell identity field, the bandwidth part identity field, the PUCCH resource identity field, and/or the spatial relation information field are used to indicate the spatial relation information of the at least one PUCCH group or indicate a group identity and the spatial relation information of the at least one PUCCH group.

Optionally, each PUCCH group is determined in any one of the following manners:

specified by a protocol; and
configured by the network-side device by using RRC signaling.

Optionally, each PUCCH group is all PUCCHs belonging to a same frequency band or all PUCCHs belonging to a same transmission and reception point.

Optionally, the group identity is determined by at least one of the following identities: a cell identity, a bandwidth part identity, a PUCCH resource identity, a frequency band identity, or a transmission and reception point identity.

Figure 3:
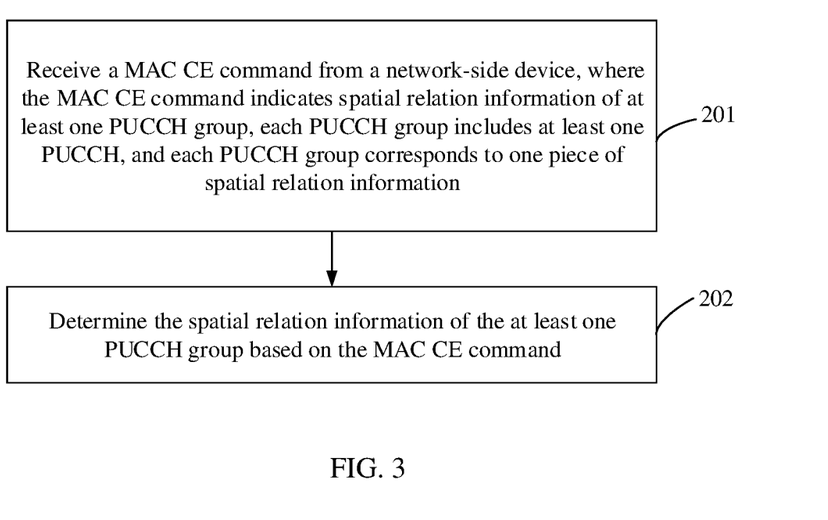
FIG. 3 is a schematic flowchart of a method for indicating spatial relation information according to an embodiment of this disclosure, where the method is applied to user equipment.

An embodiment of this disclosure further provides a method for indicating spatial relation information. The method is applied to user equipment. As shown in FIG. 3, the method includes the following steps.

Step 201: Receive a media access control control element (MAC CE) command from a network-side device, where the MAC CE command indicates spatial relation information of at least one PUCCH group, each PUCCH group includes at least one PUCCH, and each PUCCH group corresponds to one piece of spatial relation information.

Step 202: Determine the spatial relation information of the at least one PUCCH group based on the MAC CE command.

In this embodiment, the MAC CE command can be used to update and/or indicate spatial relation information of one PUCCH group, and the PUCCH group includes at least one PUCCH. This can improve flexibility of indicating spatial relation information of PUCCHs, and is compatible with a method for indicating spatial relation information of a PUCCH in the related art. In comparison with the related art that allows one MAC CE to update and/or indicate spatial relation information of only one PUCCH, signaling overheads for indicating the spatial relation information of the PUCCHs can be reduced.

Optionally, the MAC CE command includes at least one of the following: a serving cell identity field, a bandwidth part identity field, a PUCCH resource identity field, a spatial relation information field, or two reserved bits.

In a specific embodiment, the MAC CE command includes first indication information, the first indication information indicates that the MAC CE command is to update or indicate spatial relation information of at least one PUCCH group or to update or indicate spatial relation information of one PUCCH, and each PUCCH group includes a plurality of PUCCHs.

Optionally, the first indication information occupies a first reserved bit and/or a second reserved bit.

In a specific example, when the first indication information indicates that the MAC CE command is to update or indicate spatial relation information of one PUCCH, the spatial relation information field is used to indicate the spatial relation information of the PUCCH.

In a specific example, when the first indication information indicates that the MAC CE command is to update or indicate spatial relation information of all PUCCHs belonging to a same BWP, at least some of bits in the PUCCH resource identity field and/or the spatial relation information field are used to indicate the spatial relation information of all the PUCCHs of the BWP.

In a specific example, all PUCCHs in one BWP are grouped into a plurality of PUCCH groups; and when the first indication information indicates that the MAC CE command is to update or indicate spatial relation information of at least one PUCCH group in a BWP indicated by the bandwidth part identity field, at least some of bits in the PUCCH resource identity field and/or the spatial relation information field are used to indicate the spatial relation information of the at least one PUCCH group or indicate a group identity and the spatial relation information of the at least one PUCCH group.

In a specific example, the first indication information occupies the first reserved bit; and when the first indication information indicates that the MAC CE command is to update or indicate spatial relation information of all PUCCHs belonging to a same cell, at least some of bits in the bandwidth part identity field, the second reserved bit, the PUCCH resource identity field, and/or the spatial relation information field are used to indicate the spatial relation information of all the PUCCHs of the cell.

In a specific example, all PUCCHs in one cell are grouped into a plurality of PUCCH groups, and the first indication information occupies the first reserved bit; and when the first indication information indicates that the MAC CE command is to update or indicate spatial relation information of at least one PUCCH group in a cell indicated by the serving cell identity field, at least some of bits in the bandwidth part identity field, the second reserved bit, the PUCCH resource identity field, and/or the spatial relation information field are used to indicate the spatial relation information of the at least one PUCCH group or indicate a group identity and the spatial relation information of the at least one PUCCH group.

In a specific example, the MAC CE command includes second indication information, the second indication information indicates that the MAC CE command is to update or indicate spatial relation information of all PUCCHs belonging to a same BWP, or to update or indicate spatial relation information of all PUCCHs belonging to a same cell, or to update or indicate spatial relation information of one PUCCH.

Optionally, the second indication information occupies a first reserved bit and a second reserved bit.

In a specific example, when the second indication information indicates that the MAC CE command is to update or indicate spatial relation information of one PUCCH, the spatial relation information field is used to indicate the spatial relation information of the PUCCH;

when the second indication information indicates that the MAC CE command is to update or indicate spatial relation information of all PUCCHs belonging to a same BWP, at least some of bits in the PUCCH resource identity field and/or the spatial relation information field are used to indicate the spatial relation information of all the PUCCHs of the BWP; or when the second indication information indicates that the MAC CE command is to update or indicate spatial relation information of all PUCCHs belonging to a same cell, at least some of bits in the bandwidth part identity field, the PUCCH resource identity field, and/or the spatial relation information field are used to indicate the spatial relation information of all the PUCCHs of the cell.

In a specific example, the MAC CE command includes third indication information, the third indication information indicates that the MAC CE command is to update or indicate spatial relation information of one PUCCH or to update or indicate spatial relation information of at least one PUCCH group, each PUCCH group includes a plurality of PUCCHs belonging to different cells or different BWPs, and the third indication information occupies a first reserved bit.

In a specific example, when the third indication information indicates that the MAC CE command is to update or indicate spatial relation information of at least one PUCCH group, at least some of bits in a second reserved bit, the serving cell identity field, the bandwidth part identity field, the PUCCH resource identity field, and/or the spatial relation information field are used to indicate the spatial relation information of the at least one PUCCH group or indicate a group identity and the spatial relation information of the at least one PUCCH group.

Optionally, each PUCCH group is determined in any one of the following manners:

specified by a protocol; and configured by the network-side device by using RRC signaling.

Optionally, each PUCCH group is all PUCCHs belonging to a same frequency band or all PUCCHs belonging to a same transmission and reception point.

Optionally, the group identity is determined by at least one of the following identities: a cell identity, a bandwidth part identity, a PUCCH resource identity, a frequency band identity, or a transmission and reception point identity.

The technical solutions to indicating spatial relation information according to this disclosure are hereinafter further described with reference to specific embodiments.

Embodiment 1

In this embodiment, a PUCCH group is all PUCCH resources in one BWP.

In this embodiment, a network-side device uses different values of a second Reserved bit in a MAC CE command to indicate whether to update and/or indicate spatial relations of all PUCCH resources in one BWP, or to update and/or indicate a spatial relation of one PUCCH resource.

For example, when the second Reserved bit in the MAC CE command is set to 0, it indicates that the MAC CE command is to update and/or indicate a spatial relation of one PUCCH resource, and a spatial relation information field in the MAC CE, that is, $S_0$ to $S_7$, is used to update and/or indicate the spatial relation of the PUCCH resource. Because a maximum of 64 spatial relations can be configured for user equipment by using RRC signaling, six bits in $S_0$ to $S_7$ may be used to indicate one spatial relation in a spatial relation pool configured by using the RRC signaling, and remaining two bits in $S_0$ to $S_7$ are reserved.

When the second Reserved bit in the MAC CE command is set to 1, it indicates that the MAC CE command is to update and/or indicate spatial relations of all PUCCH resources in a BWP indicated by a BWP ID.

Specifically, a part or all of seven bits in a PUCCH resource identity (PUCCH Resource ID) field and eight bits in $S_0$ to $S_7$ may be used to update and/or indicate a spatial relation in the spatial relation pool configured by using the RRC signaling. For example, six bits are used to update and/or indicate a spatial relation in the spatial relation pool configured by using the RRC signaling. The updated and/or indicated spatial relation is used for all the PUCCH resources in the BWP.

Embodiment 2

In this embodiment, a PUCCH group is all PUCCH resources in one cell.

In this embodiment, a network-side device uses different values of a first Reserved bit in a MAC CE command to indicate whether to update and/or indicate spatial relations of all PUCCH resources in one cell, or to update and/or indicate a spatial relation of one PUCCH resource.

For example, when the first Reserved bit in the MAC CE command is set to 0, it indicates that the MAC CE command is to update and/or indicate a spatial relation of one PUCCH resource, and a spatial relation information field in the MAC CE, that is, $S_0$ to $S_7$, is used to update and/or indicate the spatial relation of the PUCCH resource.

Because a maximum of 64 spatial relations can be configured for user equipment by using RRC signaling, six bits in $S_0$ to $S_7$ may be used to indicate one spatial relation in a spatial relation pool configured by using the RRC signaling, and remaining two bits in $S_0$ to $S_7$ are reserved.

When the first Reserved bit in the MAC CE command is set to 1, it indicates that the MAC CE command is to update and/or indicate spatial relations of all PUCCH resources in a cell indicated by a serving cell identity (Serving Cell ID) field.

Specifically, a part or all of two bits in a bandwidth part identity field (BWP ID field), a second reserved bit R, seven bits in a PUCCH resource identity field, and eight bits in $S_0$ to S7 may be used to update and/or indicate a spatial relation. For example, six bits are used to update and/or indicate a spatial relation in a spatial relation pool configured by using the RRC signaling. The updated and/or indicated spatial relation is used for all the PUCCH resources in the cell.

Embodiment 3

In this embodiment, it is assumed that a first reserved bit R in a MAC CE command is R1 and that a second reserved bit R is R2.

When R1 is set to 0 and R2 is set to 0, it indicates that the MAC CE command is to update and/or indicate a spatial relation of one PUCCH resource, and $S_0$ to $S_7$ are used to update and/or indicate the spatial relation of the PUCCH resource.

When R1 is set to 0 and R2 is set to 1, it indicates that the MAC CE command is to update and/or indicate spatial relations of all PUCCH resources in a BWP indicated by a BWP ID. A part or all of seven bits in a PUCCH resource ID field and eight bits in $S_0$ to $S_7$ may be used to update and/or indicate a spatial relation.

When R1 is set to 1 and R2 is set to 0, it indicates that the MAC CE command is to update and/or indicate spatial relations of all PUCCH resources in a cell indicated by a serving cell ID. A part or all of two bits in a BWP ID field, seven bits in the PUCCH resource ID field, and eight bits in $S_0$ to $S_7$ may be used to update and/or indicate a spatial relation.

A case in which R1 is set to 1 and R2 is set to 1 is reserved.

Embodiment 4

In this embodiment, when all PUCCH resources in one BWP are grouped into a plurality of PUCCH resource groups, the following manner is used.

When a second reserved bit R in a MAC CE command is set to 0, it indicates that the MAC CE command is to update and/or indicate a spatial relation of one PUCCH resource, and a spatial relation information field in the MAC CE, that is, $S_0$ to $S_7$, is used to update and/or indicate the spatial relation of the PUCCH resource.

When the second reserved bit R in the MAC CE command is set to 1, it indicates that the MAC CE is to:

(1) update and/or indicate a spatial relation of a PUCCH resource group in a BWP indicated by a BWP ID; or
(2) update and/or indicate a spatial relation of a par or all of PUCCH resource groups in a BWP indicated by a BWP ID.

For (1), a part or all of seven bits in a PUCCH resource identity (PUCCH Resource ID) field and eight bits in $S_0$ to $S_7$ may be used to indicate a group identity (group ID) of the PUCCH resource group and the corresponding spatial relation, and the updated and/or indicated spatial relation is used for all PUCCH resources in the group.

For (2), a part or all of seven bits in a PUCCH resource identity (PUCCH Resource ID) field and eight bits in $S_0$ to $S_7$ may be used to indicate a spatial relation of each PUCCH resource group.

In a specific example, the spatial relation of each PUCCH resource group may be indicated based on a combination of group ID+spatial relation information, for example: group ID 1+spatial relation 1+ . . . +group ID N+spatial relation N.

In another specific example, a group identity of each PUCCH resource group may be indicated sequentially first, and then the spatial relation of each PUCCH resource group may be indicated sequentially, for example, group ID 1+ . . . +group ID N+spatial relation 1+ . . . +spatial relation N.

In another specific example, the spatial relation of each PUCCH resource group may be indicated sequentially based on a group identity sequence of each PUCCH resource group, for example, spatial relation 1+ . . . +spatial relation N. In this case, the spatial relations of all the PUCCH resource groups in the BWP indicated by the BWP ID are generally updated and/or indicated.

Embodiment 5

In this embodiment, when all PUCCH resources in one cell are grouped into a plurality of PUCCH resource groups, the following manner is used:

When a first reserved bit R in a MAC CE command is set to 0, it indicates that the MAC CE command is to update and/or indicate a spatial relation of one PUCCH resource, and a spatial relation information field in the MAC CE command, that is, $S_0$ to $S_7$, is used to update and/or indicate the spatial relation of the PUCCH resource.

When the first reserved bit R in the MAC CE command is set to 1, it indicates that the MAC CE is to:

(1) update and/or indicate a spatial relation of a PUCCH resource group in a cell indicated by a serving cell identity (Serving Cell ID) field; or
(2) update and/or indicate spatial relations of a part or all of PUCCH resource groups in a cell indicated by a serving cell identity (Serving Cell ID) field.

For (1), a part or all of two bits in a BWP ID field, a second reserved bit R, seven bits in a PUCCH resource ID field, and eight bits in $S_0$ to $S_7$ may be used to indicate a group identity (group ID) of the PUCCH resource group and the corresponding spatial relation, and the updated and/or indicated spatial relation is used for all PUCCH resources in the group.

For (2), a part or all of two bits in a BWP ID field, a second reserved bit R, seven bits in a PUCCH resource ID field, and eight bits in $S_0$ to $S_7$ may be used to indicate a spatial relation of each PUCCH resource group.

In a specific example, the spatial relation of each PUCCH resource group may be indicated based on a combination of group ID+spatial relation information, for example: group ID 1+spatial relation 1+ . . . +group ID N+spatial relation N.

In another specific example, a group identity of each PUCCH resource group may be indicated sequentially first, and then the spatial relation of each PUCCH resource group may be indicated sequentially, for example, group ID 1+ . . . +group ID N+spatial relation 1+ . . . +spatial relation N.

In another specific example, the spatial relation of each PUCCH resource group may be indicated sequentially based on a group identity sequence of each PUCCH resource group, for example, spatial relation 1+ . . . +spatial relation N. In this case, the spatial relations of all the PUCCH resource groups in the cell indicated by the serving cell ID are generally updated and/or indicated.

Embodiment 6

In this embodiment, when PUCCH resources in a PUCCH resource group may belong to different cells and/or BWPs, the following manner is used:

When a first reserved bit R in a MAC CE command is set to 0, it indicates that the MAC CE is to update and/or indicate a spatial relation of one PUCCH resource, and a spatial relation information field in the MAC CE, that is, $S_0$ to $S_7$, is used to update and/or indicate the spatial relation of the PUCCH resource.

When the first reserved bit R in the MAC CE command is set to 1, it indicates that the MAC CE is to:
  (1) update and/or indicate a spatial relation of a PUCCH resource group; or
  (2) update and/or indicate a spatial relation of a part or all of PUCCH resource groups.

For (1), a part or all of remaining bits other than the first reserved bit R in the MAC CE command may be used to indicate a group identity (group ID) of the PUCCH resource group and the corresponding spatial relation, and the updated and/or indicated spatial relation is used for all PUCCH resources in the group.

For (2), a part or all of remaining bits other than the first reserved bit R in the MAC CE command may be used to indicate a spatial relation of each PUCCH resource group.

In a specific example, the spatial relation of each PUCCH resource group may be indicated based on a combination of group ID+spatial relation information, for example: group ID 1+spatial relation 1+ . . . +group ID N+spatial relation N.

In another specific example, a group identity of each PUCCH resource group may be indicated sequentially first, and then the spatial relation of each PUCCH resource group may be indicated sequentially, for example, group ID 1+ . . . +group ID N+spatial relation 1+ . . . +spatial relation N.

In another specific example, the spatial relation of each PUCCH resource group may be indicated sequentially based on a group identity sequence of each PUCCH resource group, for example, spatial relation 1+ . . . +spatial relation N. In this case, the spatial relations of all the PUCCH resource groups are generally updated and/or indicated.

In the foregoing embodiment, the network-side device may indicate a PUCCH resource group to the user equipment by using RRC signaling, or a PUCCH resource group indication such as a PUCCH resource group ID is added to a protocol.

Each PUCCH resource group may be in a one-to-one correspondence with a transmission and reception point (TRP). Therefore, a group ID may be a TRP ID. The TRP ID may be an explicit ID or implicitly indicated by another ID.

Optionally, each PUCCH resource group may be determined by using a cell ID and/or a BWP ID and/or a PUCCH resource ID.

Optionally, all PUCCH resources in a same band may be one group.

In this embodiment, the MAC CE command can be used to update and/or indicate a spatial relation of one PUCCH resource group. This can improve flexibility of indicating spatial relations of PUCCHs, and is compatible with a method for indicating a spatial relation of a PUCCH in the related art. In comparison with the related art that allows one MAC CE to update and/or indicate a spatial relation of only one PUCCH, signaling overheads for indicating the spatial relations of the PUCCHs can be reduced.

Figure 4:
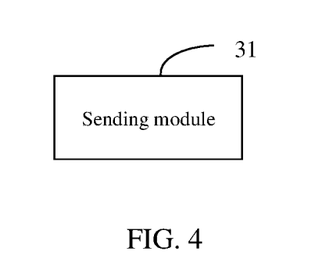
FIG. 4 is a structural block diagram of an apparatus for indicating spatial relation information according to an embodiment of this disclosure, where the apparatus is applied to a network-side device.

An embodiment of this disclosure further provides an apparatus for indicating spatial relation information. The apparatus is applied to a network-side device. As shown in FIG. 4, the apparatus includes:
  a sending module 31, configured to send a media access control control element MAC CE command to user equipment, where the MAC CE command indicates spatial relation information of at least one PUCCH group, each PUCCH group includes at least one PUCCH, and each PUCCH group corresponds to one piece of spatial relation information.

In this embodiment, the MAC CE command can be used to update and/or indicate spatial relation information of one PUCCH group, and the PUCCH group includes at least one PUCCH. This can improve flexibility of indicating spatial relation information of PUCCHs, and is compatible with a method for indicating spatial relation information of a PUCCH in the related art. In comparison with the related art that allows one MAC CE to update and/or indicate spatial relation information of only one PUCCH, signaling overheads for indicating the spatial relation information of the PUCCHs can be reduced.

Optionally, the MAC CE command includes at least one of the following: a serving cell identity field, a bandwidth part identity field, a PUCCH resource identity field, a spatial relation information field, or two reserved bits.

In a specific embodiment, the MAC CE command includes first indication information, the first indication information indicates that the MAC CE command is to update or indicate spatial relation information of at least one PUCCH group or to update or indicate spatial relation information of one PUCCH, and each PUCCH group includes a plurality of PUCCHs.

Optionally, the first indication information occupies a first reserved bit and/or a second reserved bit.

In a specific example, when the first indication information indicates that the MAC CE command is to update or indicate spatial relation information of one PUCCH, the spatial relation information field is used to indicate the spatial relation information of the PUCCH.

In a specific example, when the first indication information indicates that the MAC CE command is to update or indicate spatial relation information of all PUCCHs belonging to a same BWP, at least some of bits in the PUCCH resource identity field and/or the spatial relation information field are used to indicate the spatial relation information of all the PUCCHs of the BWP.

In a specific example, all PUCCHs in one BWP are grouped into a plurality of PUCCH groups; and
  when the first indication information indicates that the MAC CE command is to update or indicate spatial relation information of at least one PUCCH group in a BWP indicated by the bandwidth part identity field, at least some of bits in the PUCCH resource identity field and/or the spatial relation information field are used to indicate the spatial relation information of the at least one PUCCH group or indicate a group identity and the spatial relation information of the at least one PUCCH group.

In a specific example, the first indication information occupies the first reserved bit; and
when the first indication information indicates that the MAC CE command is to update or indicate spatial relation information of all PUCCHs belonging to a same cell, at least some of bits in the bandwidth part identity field, the second reserved bit, the PUCCH resource identity field, and/or the spatial relation information field are used to indicate the spatial relation information of all the PUCCHs of the cell.

In a specific example, all PUCCHs in one cell are grouped into a plurality of PUCCH groups, and the first indication information occupies the first reserved bit; and
when the first indication information indicates that the MAC CE command is to update or indicate spatial relation information of at least one PUCCH group in a cell indicated by the serving cell identity field, at least some of bits in the bandwidth part identity field, the second reserved bit, the PUCCH resource identity field, and/or the spatial relation information field are used to indicate the spatial relation information of the at least one PUCCH group or indicate a group identity and the spatial relation information of the at least one PUCCH group.

In a specific example, the MAC CE command includes second indication information, the second indication information indicates that the MAC CE command is to update or indicate spatial relation information of all PUCCHs belonging to a same BWP, or to update or indicate spatial relation information of all PUCCHs belonging to a same cell, or to update or indicate spatial relation information of one PUCCH.

Optionally, the second indication information occupies a first reserved bit and a second reserved bit.

In a specific example, when the second indication information indicates that the MAC CE command is to update or indicate spatial relation information of one PUCCH, the spatial relation information field is used to indicate the spatial relation information of the PUCCH;
when the second indication information indicates that the MAC CE command is to update or indicate spatial relation information of all PUCCHs belonging to a same BWP, at least some of bits in the PUCCH resource identity field and/or the spatial relation information field are used to indicate the spatial relation information of all the PUCCHs of the BWP; or
when the second indication information indicates that the MAC CE command is to update or indicate spatial relation information of all PUCCHs belonging to a same cell, at least some of bits in the bandwidth part identity field, the PUCCH resource identity field, and/or the spatial relation information field are used to indicate the spatial relation information of all the PUCCHs of the cell.

In a specific example, the MAC CE command includes third indication information, the third indication information indicates that the MAC CE command is to update or indicate spatial relation information of one PUCCH or to update or indicate spatial relation information of at least one PUCCH group, each PUCCH group includes a plurality of PUCCHs belonging to different cells or different BWPs, and the third indication information occupies a first reserved bit.

In a specific example, when the third indication information indicates that the MAC CE command is to update or indicate spatial relation information of at least one PUCCH group, at least some of bits in a second reserved bit, the serving cell identity field, the bandwidth part identity field, the PUCCH resource identity field, and/or the spatial relation information field are used to indicate the spatial relation information of the at least one PUCCH group or indicate a group identity and the spatial relation information of the at least one PUCCH group.

Optionally, each PUCCH group is determined in any one of the following manners:
specified by a protocol; and
configured by the network-side device by using RRC signaling.

Optionally, each PUCCH group is all PUCCHs belonging to a same frequency band or all PUCCHs belonging to a same transmission and reception point.

Optionally, the group identity is determined by at least one of the following identities: a cell identity, a bandwidth part identity, a PUCCH resource identity, a frequency band identity, or a transmission and reception point identity.

Figure 5:
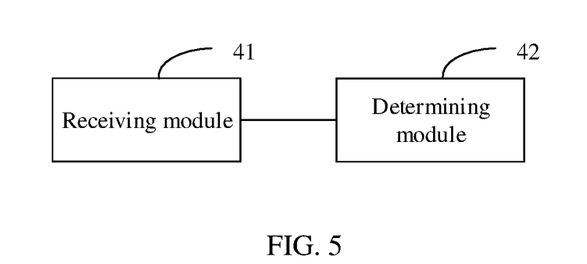
FIG. 5 is a structural block diagram of an apparatus for indicating spatial relation information according to an embodiment of this disclosure, where the apparatus is applied to user equipment.

An embodiment of this disclosure further provides an apparatus for indicating spatial relation information. The apparatus is applied to user equipment. As shown in FIG. 5, the apparatus includes:
a receiving module 41, configured to receive a media access control control element (MAC CE) command from a network-side device, where the MAC CE command indicates spatial relation information of at least one PUCCH group, each PUCCH group includes at least one PUCCH, and each PUCCH group corresponds to one piece of spatial relation information; and
a determining module 42, configured to determine the spatial relation information of the at least one PUCCH group based on the MAC CE command.

In this embodiment, the MAC CE command can be used to update and/or indicate spatial relation information of one PUCCH group, and the PUCCH group includes at least one PUCCH. This can improve flexibility of indicating spatial relation information of PUCCHs, and is compatible with a method for indicating spatial relation information of a PUCCH in the related art. In comparison with the related art that allows one MAC CE to update and/or indicate spatial relation information of only one PUCCH, signaling overheads for indicating the spatial relation information of the PUCCHs can be reduced.

Optionally, the MAC CE command includes at least one of the following: a serving cell identity field, a bandwidth part identity field, a PUCCH resource identity field, a spatial relation information field, or two reserved bits.

In a specific embodiment, the MAC CE command includes first indication information, the first indication information indicates that the MAC CE command is to update or indicate spatial relation information of at least one PUCCH group or to update or indicate spatial relation information of one PUCCH, and each PUCCH group includes a plurality of PUCCHs.

Optionally, the first indication information occupies a first reserved bit and/or a second reserved bit.

In a specific example, when the first indication information indicates that the MAC CE command is to update or indicate spatial relation information of one PUCCH, the spatial relation information field is used to indicate the spatial relation information of the PUCCH.

In a specific example, when the first indication information indicates that the MAC CE command is to update or indicate spatial relation information of all PUCCHs belonging to a same BWP, at least some of bits in the PUCCH resource identity field and/or the spatial relation information field are used to indicate the spatial relation information of all the PUCCHs of the BWP.

In a specific example, all PUCCHs in one BWP are grouped into a plurality of PUCCH groups; and when the first indication information indicates that the MAC CE command is to update or indicate spatial relation information of at least one PUCCH group in a BWP indicated by the bandwidth part identity field, at least some of bits in the PUCCH resource identity field and/or the spatial relation information field are used to indicate the spatial relation information of the at least one PUCCH group or indicate a group identity and the spatial relation information of the at least one PUCCH group.

In a specific example, the first indication information occupies the first reserved bit; and when the first indication information indicates that the MAC CE command is to update or indicate spatial relation information of all PUCCHs belonging to a same cell, at least some of bits in the bandwidth part identity field, the second reserved bit, the PUCCH resource identity field, and/or the spatial relation information field are used to indicate the spatial relation information of all the PUCCHs of the cell.

In a specific example, all PUCCHs in one cell are grouped into a plurality of PUCCH groups, and the first indication information occupies the first reserved bit; and when the first indication information indicates that the MAC CE command is to update or indicate spatial relation information of at least one PUCCH group in a cell indicated by the serving cell identity field, at least some of bits in the bandwidth part identity field, the second reserved bit, the PUCCH resource identity field, and/or the spatial relation information field are used to indicate the spatial relation information of the at least one PUCCH group or indicate a group identity and the spatial relation information of the at least one PUCCH group.

In a specific example, the MAC CE command includes second indication information, the second indication information indicates that the MAC CE command is to update or indicate spatial relation information of all PUCCHs belonging to a same BWP, or to update or indicate spatial relation information of all PUCCHs belonging to a same cell, or to update or indicate spatial relation information of one PUCCH.

Optionally, the second indication information occupies a first reserved bit and a second reserved bit.

In a specific example, when the second indication information indicates that the MAC CE command is to update or indicate spatial relation information of one PUCCH, the spatial relation information field is used to indicate the spatial relation information of the PUCCH;

when the second indication information indicates that the MAC CE command is to update or indicate spatial relation information of all PUCCHs belonging to a same BWP, at least some of bits in the PUCCH resource identity field and/or the spatial relation information field are used to indicate the spatial relation information of all the PUCCHs of the BWP; or when the second indication information indicates that the MAC CE command is to update or indicate spatial relation information of all PUCCHs belonging to a same cell, at least some of bits in the bandwidth part identity field, the PUCCH resource identity field, and/or the spatial relation information field are used to indicate the spatial relation information of all the PUCCHs of the cell.

In a specific example, the MAC CE command includes third indication information, the third indication information indicates that the MAC CE command is to update or indicate spatial relation information of one PUCCH or to update or indicate spatial relation information of at least one PUCCH group, each PUCCH group includes a plurality of PUCCHs belonging to different cells or different BWPs, and the third indication information occupies a first reserved bit.

In a specific example, when the third indication information indicates that the MAC CE command is to update or indicate spatial relation information of at least one PUCCH group, at least some of bits in a second reserved bit, the serving cell identity field, the bandwidth part identity field, the PUCCH resource identity field, and/or the spatial relation information field are used to indicate the spatial relation information of the at least one PUCCH group or indicate a group identity and the spatial relation information of the at least one PUCCH group.

Optionally, each PUCCH group is determined in any one of the following manners:
    specified by a protocol; and
    configured by the network-side device by using RRC signaling.

Optionally, each PUCCH group is all PUCCHs belonging to a same frequency band or all PUCCHs belonging to a same transmission and reception point.

Optionally, the group identity is determined by at least one of the following identities: a cell identity, a bandwidth part identity, a PUCCH resource identity, a frequency band identity, or a transmission and reception point identity.

An embodiment of this disclosure further provides a communications device, including a memory, a processor, and a computer program stored in the memory and capable of running on the processor, where when the computer program is executed by the processor, steps of the foregoing method for indicating spatial relation information are implemented.

The communications device may be user equipment or a network-side device.

Figure 6:
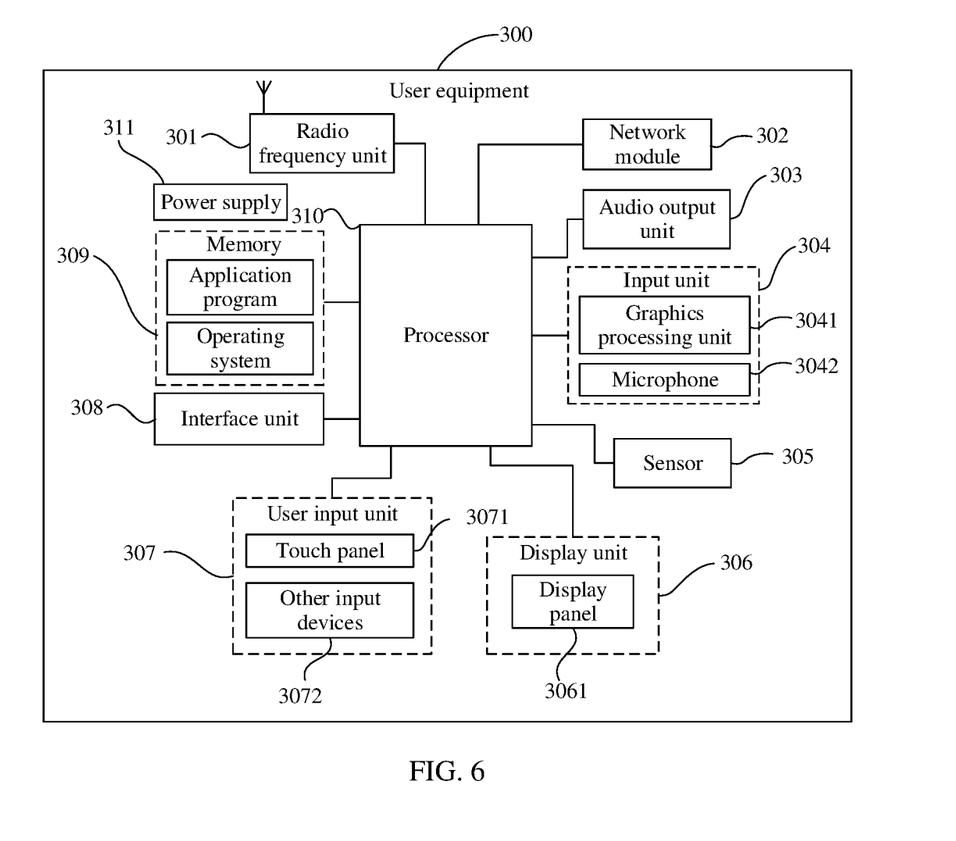
FIG. 6 is a schematic diagram of composition of user equipment according to an embodiment of this disclosure.

When the communications device is user equipment, as shown in FIG. 6, the user equipment 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. Persons skilled in the art may understand that the user equipment structure shown in FIG. 6 does not constitute any limitation on the user equipment. The user equipment may include more or fewer components than those shown in the figure, or some components may be combined, or the components may be disposed in different manners. In this embodiment of this disclosure, the user equipment includes but is not limited to a mobile phone, a tablet computer, a laptop computer, a palmtop computer, an in-vehicle terminal, a wearable device, a pedometer, and the like.

The processor 310 is configured to receive a media access control control element (MAC CE) command from a network-side device, where the MAC CE command indicates spatial relation information of at least one PUCCH group, each PUCCH group includes at least one PUCCH, and each PUCCH group corresponds to one piece of spatial relation information; and determine the spatial relation information of the at least one PUCCH group based on the MAC CE command.

Optionally, the MAC CE command includes at least one of the following: a serving cell identity field, a bandwidth part identity field, a PUCCH resource identity field, a spatial relation information field, or two reserved bits.

In a specific embodiment, the MAC CE command includes first indication information, the first indication information indicates that the MAC CE command is to update or indicate spatial relation information of at least one PUCCH group or to update or indicate spatial relation information of one PUCCH, and each PUCCH group includes a plurality of PUCCHs.

Optionally, the first indication information occupies a first reserved bit and/or a second reserved bit.

In a specific example, when the first indication information indicates that the MAC CE command is to update or indicate spatial relation information of one PUCCH, the spatial relation information field is used to indicate the spatial relation information of the PUCCH.

In a specific example, when the first indication information indicates that the MAC CE command is to update or indicate spatial relation information of all PUCCHs belonging to a same BWP, at least some of bits in the PUCCH resource identity field and/or the spatial relation information field are used to indicate the spatial relation information of all the PUCCHs of the BWP.

In a specific example, all PUCCHs in one BWP are grouped into a plurality of PUCCH groups; and
when the first indication information indicates that the MAC CE command is to update or indicate spatial relation information of at least one PUCCH group in a BWP indicated by the bandwidth part identity field, at least some of bits in the PUCCH resource identity field and/or the spatial relation information field are used to indicate the spatial relation information of the at least one PUCCH group or indicate a group identity and the spatial relation information of the at least one PUCCH group.

In a specific example, the first indication information occupies the first reserved bit; and
when the first indication information indicates that the MAC CE command is to update or indicate spatial relation information of all PUCCHs belonging to a same cell, at least some of bits in the bandwidth part identity field, the second reserved bit, the PUCCH resource identity field, and/or the spatial relation information field are used to indicate the spatial relation information of all the PUCCHs of the cell.

In a specific example, all PUCCHs in one cell are grouped into a plurality of PUCCH groups, and the first indication information occupies the first reserved bit; and
when the first indication information indicates that the MAC CE command is to update or indicate spatial relation information of at least one PUCCH group in a cell indicated by the serving cell identity field, at least some of bits in the bandwidth part identity field, the second reserved bit, the PUCCH resource identity field, and/or the spatial relation information field are used to indicate the spatial relation information of the at least one PUCCH group or indicate a group identity and the spatial relation information of the at least one PUCCH group.

In a specific example, the MAC CE command includes second indication information, the second indication information indicates that the MAC CE command is to update or indicate spatial relation information of all PUCCHs belonging to a same BWP, or to update or indicate spatial relation information of all PUCCHs belonging to a same cell, or to update or indicate spatial relation information of one PUCCH.

Optionally, the second indication information occupies a first reserved bit and a second reserved bit.

In a specific example, when the second indication information indicates that the MAC CE command is to update or indicate spatial relation information of one PUCCH, the spatial relation information field is used to indicate the spatial relation information of the PUCCH;
when the second indication information indicates that the MAC CE command is to update or indicate spatial relation information of all PUCCHs belonging to a same BWP, at least some of bits in the PUCCH resource identity field and/or the spatial relation information field are used to indicate the spatial relation information of all the PUCCHs of the BWP; or
when the second indication information indicates that the MAC CE command is to update or indicate spatial relation information of all PUCCHs belonging to a same cell, at least some of bits in the bandwidth part identity field, the PUCCH resource identity field, and/or the spatial relation information field are used to indicate the spatial relation information of all the PUCCHs of the cell.

In a specific example, the MAC CE command includes third indication information, the third indication information indicates that the MAC CE command is to update or indicate spatial relation information of one PUCCH or to update or indicate spatial relation information of at least one PUCCH group, each PUCCH group includes a plurality of PUCCHs belonging to different cells or different BWPs, and the third indication information occupies a first reserved bit.

In a specific example, when the third indication information indicates that the MAC CE command is to update or indicate spatial relation information of at least one PUCCH group, at least some of bits in a second reserved bit, the serving cell identity field, the bandwidth part identity field, the PUCCH resource identity field, and/or the spatial relation information field are used to indicate the spatial relation information of the at least one PUCCH group or indicate a group identity and the spatial relation information of the at least one PUCCH group.

Optionally, each PUCCH group is determined in any one of the following manners:
specified by a protocol; and
configured by the network-side device by using RRC signaling.

Optionally, each PUCCH group is all PUCCHs belonging to a same frequency band or all PUCCHs belonging to a same transmission and reception point.

Optionally, the group identity is determined by at least one of the following identities: a cell identity, a bandwidth part identity, a PUCCH resource identity, a frequency band identity, or a transmission and reception point identity.

It should be understood that in this embodiment of this disclosure, the radio frequency unit 301 may be configured to: receive and transmit signals in an information receiving/transmitting process or a call process; and specifically, after receiving downlink data from a base station, transmit the downlink data to the processor 310 for processing, and in addition, transmit uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may further communicate with a network and another device through a wireless communications system.

The user equipment provides a user with wireless broadband internet access through the network module 302, for example, helping the user to send or receive an e-mail, to browse a web page, or to access streaming media.

The audio output unit 303 may convert audio data received by the radio frequency unit 301 or the network module 302 or stored in the memory 309 into an audio signal, and output the audio signal as a sound. Furthermore, the audio output unit 303 may also provide audio output (for example, a call signal received sound or a message received sound) related to a specific function performed by the user equipment 300. The audio output unit 303 includes a speaker, a buzzer, a telephone receiver, and the like.

The input unit 304 is configured to receive an audio or video signal. The input unit 304 may include a graphics processing unit (GPU) 3041 and a microphone 3042. The graphics processing unit 3041 processes image data of a still picture or a video obtained by an image capture apparatus (for example, a camera) in an image capture mode or a video capture mode. A processed image frame may be displayed on the display unit 306. An image frame processed by the graphics processing unit 3041 may be stored in the memory 309 (or another storage medium) or sent by the radio frequency unit 301 or the network module 302. The microphone 3042 can receive a sound and can process the sound into audio data. The processed audio data can be converted into a format output that can be sent to a mobile communication base station through the radio frequency unit 301 in a telephone call mode.

The user equipment 300 further includes at least one sensor 305, such as a light sensor, a motion sensor, and other sensors. Specifically, the light sensor includes an ambient light sensor and a proximity sensor. The ambient light sensor may adjust luminance of a display panel 3031 based on brightness of ambient light. The proximity sensor may turn off the display panel 3031 and/or backlight when the user equipment 300 is moved to an ear. As a type of motion sensor, an accelerometer sensor can detect magnitudes of accelerations in all directions (usually three axes), can detect a magnitude and a direction of gravity when the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 305 may also include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information input by the user or information provided for the user. The display unit 306 may include the display panel 3031. The display panel 3031 may be configured in a form of a liquid crystal display (LCD), an organic light-emitting diode (OLED), or the like.

The user input unit 307 may be configured to receive input digit or character information and generate key signal input related to user setting and function control of the user equipment. Specifically, the user input unit 307 includes a touch panel 3071 and other input devices 3072. The touch panel 3071, also referred to as a touchscreen, may capture a touch operation performed by the user on or near the touch panel (for example, an operation performed by the user on the touch panel 3071 or near the touch panel 3071 by using any appropriate object or accessory such as a finger or a stylus). The touch panel 3071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 310, and receives and executes a command sent by the processor 310. In addition, the touch panel 3071 may be implemented in a plurality of forms, for example, a resistive, capacitive, infrared, or surface acoustic wave touch panel. The user input unit 307 may further include the other input devices 3072 in addition to the touch panel 3071. Specifically, the other input devices 3072 may include but are not limited to a physical keyboard, a function key (such as a volume control key or a power on/off key), a trackball, a mouse, a joystick, and the like. Details are not described herein.

Further, the touch panel 3071 may cover the display panel 3031. After the touch panel 3071 detects a touch operation on or near the touch panel, the touch panel 3071 transmits the touch operation to the processor 310 to determine a type of a touch event. Then the processor 310 provides a corresponding visual output on the display panel 3031 based on the type of the touch event. Although in FIG. 6, the touch panel 3071 and the display panel 3031 act as two independent parts to implement input and output functions of the user equipment, in some embodiments, the touch panel 3071 and the display panel 3031 may be integrated to implement the input and output functions of the user equipment. This is not specifically limited herein.

The interface unit 308 is an interface connecting an external apparatus to the user equipment 300. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 308 may be configured to: receive input (for example, data information and power) from the external apparatus, and transmit the received input to one or more elements in the user equipment 300, or may be configured to transmit data between the user equipment 300 and the external apparatus.

The memory 309 may be configured to store a software program and various data. The memory 309 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 309 may include a high-speed random access memory, or may include a non-volatile memory, for example, at least one magnetic disk storage device, a flash memory, or other non-volatile solid-state storage devices.

The processor 310 is a control center of the user equipment, and is connected to all components of the user equipment by using various interfaces and lines. By running or executing a software program and/or module that is stored in the memory 309 and calling data stored in the memory 309, the processor 310 executes various functions of the user equipment and processes data, so as to perform overall monitoring on the user equipment. The processor 310 may include one or more processing units. Optionally, the processor 310 may integrate an application processor and a modem processor. The application processor mainly processes the operating system, a user interface, an application program, and the like. The modem processor mainly processes wireless communication. It may be understood that the modem processor may alternatively not be integrated into the processor 310.

The user equipment 300 may further include the power supply 311 (such as a battery) for supplying power to the components. Optionally, the power supply 311 may be logically connected to the processor 310 through a power management system. In this way, functions such as charge management, discharge management, and power consumption management are implemented by using the power management system.

In addition, the user equipment 300 includes some functional modules that are not shown, details of which are not described herein.

Figure 7:
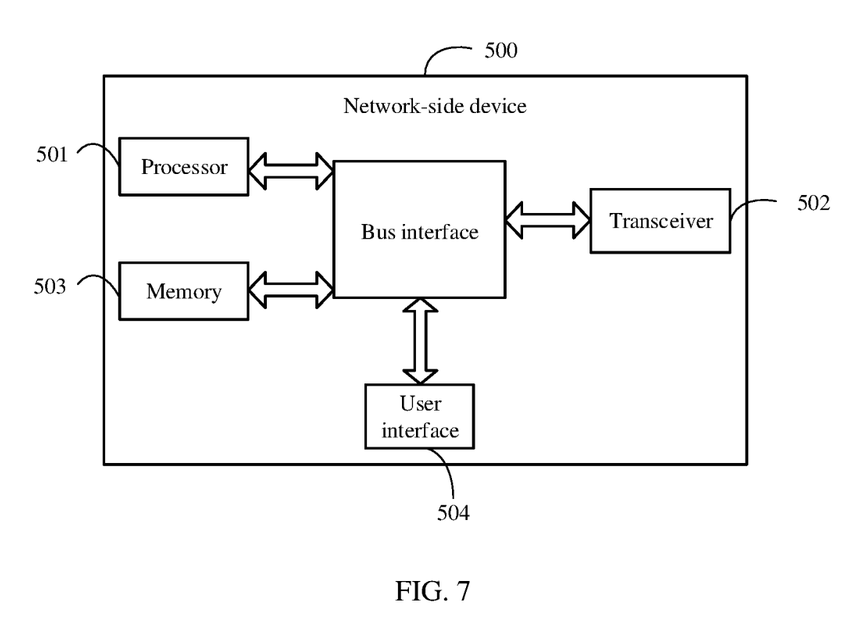
FIG. 7 is a schematic diagram of composition of a network-side device according to an embodiment of this disclosure.

When the communications device is a network-side device, as shown in FIG. 7, the network-side device 500 includes a processor 501, a transceiver 502, a memory 503, a user interface 504, and a bus interface.

In this embodiment of this disclosure, the network-side device 500 further includes a computer program stored in the memory 503 and capable of running on the processor 501. When the computer program is executed by the processor 501, the following step is implemented: sending a media access control control element (MAC CE) command to user equipment, where the MAC CE command indicates spatial relation information of at least one PUCCH group, each PUCCH group includes at least one PUCCH, and each PUCCH group corresponds to one piece of spatial relation information.

In FIG. 7, a bus architecture may include any quantity of interconnect buses and bridges, specifically for interconnecting various circuits of one or more processors represented by the processor 501 and a memory represented by the memory 503. The bus architecture may further interconnect various other circuits such as a peripheral device, a voltage regulator, and a power management circuit. These are all well known in the art, and therefore are not further described in this specification. The bus interface provides an interface. The transceiver 502 may be a plurality of components, that is, the transceiver 502 includes a transmitter and a receiver, and provides a unit for communicating with various other apparatuses on a transmission medium. For different user equipment, the user interface 504 may also be an interface for externally or internally connecting a required device, and the connected device includes but is not limited to a mini keyboard, a display, a speaker, a microphone, a joystick, or the like.

The processor 501 is responsible for bus architecture management and general processing. The memory 503 may store data used when the processor 501 performs an operation.

Optionally, the MAC CE command includes at least one of the following: a serving cell identity field, a bandwidth part identity field, a PUCCH resource identity field, a spatial relation information field, or two reserved bits.

In a specific embodiment, the MAC CE command includes first indication information, the first indication information indicates that the MAC CE command is to update or indicate spatial relation information of at least one PUCCH group or to update or indicate spatial relation information of one PUCCH, and each PUCCH group includes a plurality of PUCCHs.

Optionally, the first indication information occupies a first reserved bit and/or a second reserved bit.

In a specific example, when the first indication information indicates that the MAC CE command is to update or indicate spatial relation information of one PUCCH, the spatial relation information field is used to indicate the spatial relation information of the PUCCH.

In a specific example, when the first indication information indicates that the MAC CE command is to update or indicate spatial relation information of all PUCCHs belonging to a same BWP, at least some of bits in the PUCCH resource identity field and/or the spatial relation information field are used to indicate the spatial relation information of all the PUCCHs of the BWP.

In a specific example, all PUCCHs in one BWP are grouped into a plurality of PUCCH groups; and
when the first indication information indicates that the MAC CE command is to update or indicate spatial relation information of at least one PUCCH group in a BWP indicated by the bandwidth part identity field, at least some of bits in the PUCCH resource identity field and/or the spatial relation information field are used to indicate the spatial relation information of the at least one PUCCH group or indicate a group identity and the spatial relation information of the at least one PUCCH group.

In a specific example, the first indication information occupies the first reserved bit; and
when the first indication information indicates that the MAC CE command is to update or indicate spatial relation information of all PUCCHs belonging to a same cell, at least some of bits in the bandwidth part identity field, the second reserved bit, the PUCCH resource identity field, and/or the spatial relation information field are used to indicate the spatial relation information of all the PUCCHs of the cell.

In a specific example, all PUCCHs in one cell are grouped into a plurality of PUCCH groups, and the first indication information occupies the first reserved bit; and
when the first indication information indicates that the MAC CE command is to update or indicate spatial relation information of at least one PUCCH group in a cell indicated by the serving cell identity field, at least some of bits in the bandwidth part identity field, the second reserved bit, the PUCCH resource identity field, and/or the spatial relation information field are used to indicate the spatial relation information of the at least one PUCCH group or indicate a group identity and the spatial relation information of the at least one PUCCH group.

In a specific example, the MAC CE command includes second indication information, the second indication information indicates that the MAC CE command is to update or indicate spatial relation information of all PUCCHs belonging to a same BWP, or to update or indicate spatial relation information of all PUCCHs belonging to a same cell, or to update or indicate spatial relation information of one PUCCH.

Optionally, the second indication information occupies a first reserved bit and a second reserved bit.

In a specific example, when the second indication information indicates that the MAC CE command is to update or indicate spatial relation information of one PUCCH, the spatial relation information field is used to indicate the spatial relation information of the PUCCH;
when the second indication information indicates that the MAC CE command is to update or indicate spatial relation information of all PUCCHs belonging to a same BWP, at least some of bits in the PUCCH resource identity field and/or the spatial relation information field are used to indicate the spatial relation information of all the PUCCHs of the BWP; or when the second indication information indicates that the MAC CE command is to update or indicate spatial relation information of all PUCCHs belonging to a same cell, at least some of bits in the bandwidth part identity field, the PUCCH resource identity field, and/or the spatial relation information field are used to indicate the spatial relation information of all the PUCCHs of the cell.

In a specific example, the MAC CE command includes third indication information, the third indication information indicates that the MAC CE command is to update or indicate spatial relation information of one PUCCH or to update or indicate spatial relation information of at least one PUCCH group, each PUCCH group includes a plurality of PUCCHs belonging to different cells or different BWPs, and the third indication information occupies a first reserved bit.

In a specific example, when the third indication information indicates that the MAC CE command is to update or indicate spatial relation information of at least one PUCCH group, at least some of bits in a second reserved bit, the serving cell identity field, the bandwidth part identity field, the PUCCH resource identity field, and/or the spatial relation information field are used to indicate the spatial relation information of the at least one PUCCH group or indicate a group identity and the spatial relation information of the at least one PUCCH group.

Optionally, each PUCCH group is determined in any one of the following manners:
specified by a protocol; and
configured by the network-side device by using RRC signaling.

Optionally, each PUCCH group is all PUCCHs belonging to a same frequency band or all PUCCHs belonging to a same transmission and reception point.

Optionally, the group identity is determined by at least one of the following identities: a cell identity, a bandwidth part identity, a PUCCH resource identity, a frequency band identity, or a transmission and reception point identity.

An embodiment of this disclosure further provides a computer-readable storage medium, where the computer-readable storage medium stores a computer program, and when the computer program is executed by a processor, steps of the foregoing method for indicating spatial relation information are implemented.

It can be understood that the embodiments described in this specification may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this application, or a combination thereof.

For software implementation, the techniques described in the embodiments described in this specification may be implemented by modules (for example, procedures or functions) that perform the functions described in the embodiments described in this specification. Software code may be stored in the memory and executed by the processor. The memory may be implemented in or outside the processor.

All embodiments in this specification are described in a progressive manner. Each embodiment focuses on differences from other embodiments. For the part that is the same or similar between different embodiments, reference may be made between the embodiments.

Persons skilled in the art should understand that the embodiments of this disclosure may be provided as a method, an apparatus, or a computer program product. Therefore, the embodiments of this disclosure may be hardware-only embodiments, software-only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer usable program code.

The embodiments of this disclosure are described with reference to the flowcharts and/or block diagrams of the method, the user equipment (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing user equipment to generate a machine, so that the instructions executed by a computer or a processor of any other programmable data processing user equipment generate an apparatus for implementing a specific function in one or more processes in the flowcharts and/or in one or more blocks in the block diagrams.

These computer program instructions may be stored in a computer-readable memory that can guide the computer or any other programmable data processing user equipment to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or other programmable data processing user equipment, so that a series of operations and steps are performed on the computer or the other programmable user equipment, thereby generating computer-implemented processing. Therefore, the instructions executed on the computer or the other programmable user equipment provide steps for implementing a specific function in one or more processes in the flowcharts and/or in one or more blocks in the block diagrams.

Although some optional embodiments in the embodiments of this disclosure have been described, persons skilled in the art can make changes and modifications to these embodiments once they learn the basic inventive concept. Therefore, the following claims are intended to be construed as to cover the preferred embodiments and all changes and modifications falling within the scope of the embodiments of this disclosure.

It should be further noted that in this specification, relational terms such as "first" and "second" are only used to distinguish one entity or operation from another, and do not necessarily require or imply that any actual relationship or sequence exists between these entities or operations. Moreover, the terms "comprise", "include", or any of their variants are intended to cover a non-exclusive inclusion, so that a process, a method, an article, or user equipment that includes a list of elements not only includes those elements but also includes other elements that are not expressly listed, or further includes elements inherent to such a process, method, article, or user equipment. In absence of more constraints, an element preceded by "includes a . . . " does not preclude existence of other identical elements in the process, method, article, or user equipment that includes the element.

The foregoing descriptions are merely optional implementations of this disclosure. It should be noted that persons of ordinary skill in the art may make several improvements or polishing without departing from the principle of this disclosure and the improvements and polishing shall fall within the protection scope of this disclosure.

What is claimed is:

1. A method for indicating spatial relation information, applied to a network-side device and comprising:
sending a media access control, control element (MAC CE) command to user equipment, wherein the MAC CE command indicates spatial relation information of at least one Physical Uplink Control Channel (PUCCH) group, each PUCCH group comprises at least one PUCCH, and each PUCCH group corresponds to one piece of spatial relation information;
wherein each PUCCH group is configured by the network-side device by using Radio Resource Control (RRC) signaling;
the MAC CE command comprises: a bandwidth part identity field;
the MAC CE command comprises first indication information, the first indication information indicates that the MAC CE command is to update or indicate spatial relation information of at least one PUCCH group, each PUCCH group comprises a plurality of PUCCHs;
all PUCCHs in one BWP are grouped into a plurality of PUCCH groups; and
when the first indication information indicates that the MAC CE command is to update or indicate spatial relation information of at least one PUCCH group in a BWP indicated by the bandwidth part identity field, at least some of bits in a PUCCH resource identity field and/or a spatial relation information field are used to indicate the spatial relation information of the at least one PUCCH group or indicate a group identity and the spatial relation information of the at least one PUCCH group.

2. The method for indicating spatial relation information according to claim 1, wherein the MAC CE command further comprises at least one of the following: a serving cell identity field, a PUCCH resource identity field, a spatial relation information field, or two reserved bits.

3. A method for indicating spatial relation information, applied to user equipment and comprising:
receiving a media access control, control element (MAC CE) command from a network-side device, wherein the MAC CE command indicates spatial relation information of at least one Physical Uplink Control Channel (PUCCH) group, each PUCCH group comprises at least one PUCCH, and each PUCCH group corresponds to one piece of spatial relation information;
wherein each PUCCH group is configured by the network-side device by using Radio Resource Control (RRC) signaling;
determining the spatial relation information of the at least one PUCCH group based on the MAC CE command;
wherein the MAC CE command comprises a bandwidth part identity field;
the MAC CE command comprises first indication information, the first indication information indicates that the MAC CE command is to update or indicate spatial relation information of at least one PUCCH group, each PUCCH group comprises a plurality of PUCCHs;
all PUCCHs in one BWP are grouped into a plurality of PUCCH groups; and
when the first indication information indicates that the MAC CE command is to update or indicate spatial relation information of at least one PUCCH group in a BWP indicated by the bandwidth part identity field, at least some of bits in a PUCCH resource identity field and/or a spatial relation information field are used to indicate the spatial relation information of the at least one PUCCH group or indicate a group identity and the spatial relation information of the at least one PUCCH group.

4. The method for indicating spatial relation information according to claim 3, wherein the MAC CE command further comprises at least one of the following: a serving cell identity field, a PUCCH resource identity field, a spatial relation information field, or two reserved bits.

5. The method for indicating spatial relation information according to claim 4, wherein
the MAC CE command comprises third indication information, the third indication information indicates that the MAC CE command is to update or indicate spatial relation information of one PUCCH or to update or indicate spatial relation information of at least one PUCCH group, each PUCCH group comprises a plurality of PUCCHs belonging to different cells or different BWPs.

6. The method for indicating spatial relation information according to claim 3, wherein each PUCCH group is all PUCCHs belonging to a same frequency band or all PUCCHs belonging to a same transmission and reception point.

7. A communications device, comprising a memory, a processor, and a computer program stored in the memory and capable of running on the processor, wherein when the computer program is executed by the processor, steps of the method for indicating spatial relation information according to claim 1 are implemented.

8. A communications device, comprising a memory, a processor, and a computer program stored in the memory and capable of running on the processor, wherein the computer program is executed by the processor to implement:
receiving a media access control, control element (MAC CE) command from a network-side device, wherein the MAC CE command indicates spatial relation information of at least one Physical Uplink Control Channel (PUCCH) group, each PUCCH group comprises at least one PUCCH, and each PUCCH group corresponds to one piece of spatial relation information;
wherein each PUCCH group is configured by the network-side device by using Radio Resource Control (RRC) signaling;
determining the spatial relation information of the at least one PUCCH group based on the MAC CE command;

wherein the MAC CE command comprises a bandwidth part identity field;

the MAC CE command comprises first indication information, the first indication information indicates that the MAC CE command is to update or indicate spatial relation information of at least one PUCCH group, each PUCCH group comprises a plurality of PUCCHs;

all PUCCHs in one BWP are grouped into a plurality of PUCCH groups; and when the first indication information indicates that the MAC CE command is to update or indicate spatial relation information of at least one PUCCH group in a BWP indicated by the bandwidth part identity field, at least some of bits in a PUCCH resource identity field and/or a spatial relation information field are used to indicate the spatial relation information of the at least one PUCCH group or indicate a group identity and the spatial relation information of the at least one PUCCH group.

9. The communications device according to claim 8, wherein the MAC CE command further comprises at least one of the following: a serving cell identity field, a PUCCH resource identity field, a spatial relation information field, or two reserved bits.

10. The communications device according to claim 9, wherein the MAC CE command comprises third indication information, the third indication information indicates that the MAC CE command is to update or indicate spatial relation information of one PUCCH or to update or indicate spatial relation information of at least one PUCCH group, each PUCCH group comprises a plurality of PUCCHs belonging to different cells or different BWPs.

11. The communications device according to claim 8, wherein each PUCCH group is all PUCCHs belonging to a same frequency band or all PUCCHs belonging to a same transmission and reception point.

12. The method for indicating spatial relation information according to claim 2, wherein the MAC CE command comprises third indication information, the third indication information indicates that the MAC CE command is to update or indicate spatial relation information of one PUCCH or to update or indicate spatial relation information of at least one PUCCH group, each PUCCH group comprises a plurality of PUCCHs belonging to different cells or different BWPs.

13. The method for indicating spatial relation information according to claim 1, wherein each PUCCH group is all PUCCHs belonging to a same frequency band or all PUCCHs belonging to a same transmission and reception point.

14. The communications device according to claim 7, wherein the MAC CE command further comprises at least one of the following: a serving cell identity field, a PUCCH resource identity field, a spatial relation information field, or two reserved bits.

15. The communications device according to claim 14, wherein the MAC CE command comprises third indication information, the third indication information indicates that the MAC CE command is to update or indicate spatial relation information of one PUCCH or to update or indicate spatial relation information of at least one PUCCH group, each PUCCH group comprises a plurality of PUCCHs belonging to different cells or different BWPs.

16. The communications device according to claim 7, wherein each PUCCH group is all PUCCHs belonging to a same frequency band or all PUCCHs belonging to a same transmission and reception point.

* * * * *